United States Patent
Zannoni et al.

(10) Patent No.: US 8,368,553 B2
(45) Date of Patent: Feb. 5, 2013

(54) FRACTURING MONITORING WITHIN A TREATMENT WELL

(75) Inventors: Steve Zannoni, Houston, TX (US); Orlando DeJesus, Frisco, TX (US); Daniel F. Dorffer, Houston, TX (US); John Quirein, Georgetown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 518 days.

(21) Appl. No.: 12/445,649

(22) PCT Filed: Nov. 1, 2007

(86) PCT No.: PCT/US2007/023103
§ 371 (c)(1),
(2), (4) Date: Jul. 6, 2010

(87) PCT Pub. No.: WO2008/057398
PCT Pub. Date: May 15, 2008

(65) Prior Publication Data
US 2010/0265094 A1    Oct. 21, 2010

Related U.S. Application Data

(60) Provisional application No. 60/863,911, filed on Nov. 1, 2006.

(51) Int. Cl.
*G01V 3/00*    (2006.01)
(52) U.S. Cl. .............. 340/854.3; 340/854.9; 367/101; 367/135
(58) Field of Classification Search ............ 367/31, 367/21, 101, 135; 702/17; 166/250.1; 181/104; 340/853.3, 854.9
See application file for complete search history.

(56) References Cited

U.S. PATENT DOCUMENTS

| | | | |
|---|---|---|---|
| 3,992,672 A | 11/1976 | Fasching | |
| 4,701,891 A * | 10/1987 | Castagna et al. | 367/31 |
| 4,759,636 A * | 7/1988 | Ahern et al. | 367/21 |
| 4,870,580 A * | 9/1989 | Lang et al. | 702/17 |
| 4,885,711 A * | 12/1989 | Neff | 702/17 |
| 5,747,750 A * | 5/1998 | Bailey et al. | 181/112 |
| 5,774,419 A | 6/1998 | Uhl et al. | |
| 7,348,894 B2 * | 3/2008 | Bailey et al. | 340/854.3 |
| 2005/0060099 A1 | 3/2005 | Sorrells et al. | |
| 2006/0023567 A1 | 2/2006 | Uhl et al. | |
| 2006/0081412 A1 * | 4/2006 | Wright et al. | 181/104 |
| 2007/0215345 A1 * | 9/2007 | Lafferty et al. | 166/250.1 |

FOREIGN PATENT DOCUMENTS

| | | |
|---|---|---|
| WO | WO-0023821 A1 | 4/2000 |
| WO | WO-2008057398 A2 | 5/2008 |
| WO | WO-2008057398 A3 | 5/2008 |

OTHER PUBLICATIONS

"International Application Serial No. PCT/US2007/023103, Search Report mailed Jun. 5, 2008", 7 pgs.
"International Application Serial No. PCT/US2007/023103, Written Opinion mailed Jun. 5, 2008", 7 Pgs.

* cited by examiner

*Primary Examiner* — Jean B Jeanglaude
(74) *Attorney, Agent, or Firm* — Schwegman, Lundberg & Woessner, P.A.; Benjamin Fite

(57) ABSTRACT

A method includes receiving a signal from a sensor that is positioned within a well bore during a hydraulic fracturing operation. A noise canceling operation is performed on the received signal to detect a microseismic event that is caused by the hydraulic fracturing operation.

39 Claims, 5 Drawing Sheets

FRACTURING MONITORING WITHIN A TREATMENT WELL

This application is a U.S National Stage Filing under 35 U.S.C. 371 from International Application Number PCT/US2007/023103, filed Nov. 1, 2007 and published in English as WO2008/057398 A2 on May 15, 2008, which claims the benefit under U.S Provisional Application, Serial Number 60/863,911, filed Nov. 1, 2006, under 35 U.S.C 119(e), which application and publication are incorporated herein by reference.

TECHNICAL FIELD

Some embodiments relate to monitoring of fractures during hydraulic fracturing of a well bore. More particularly, some embodiments relate to monitoring of such fractures within the well bore where hydraulic fracturing is being performed.

BACKGROUND

A number of techniques have been developed to increase the production of hydrocarbons from well bores drilled in the Earth. One technique includes hydraulic fracturing. A hydraulic fracturing operation fractures a portion of the subsurface formation by injecting a fluid into the well bore that creates or extends one or more fractures therein.

BRIEF DESCRIPTION OF THE DRAWINGS

Embodiments of the invention may be best understood by referring to the following description and accompanying drawings which illustrate such embodiments. In the drawings.

DETAILED DESCRIPTION

Methods, apparatus and systems for hydraulic fracturing monitoring in the treatment well are described. In the following description, numerous specific details are set forth. However, it is understood that embodiments of the invention may be practiced without these specific details. In other instances, well-known circuits, structures and techniques have not been shown in detail in order not to obscure the understanding of this description.

System Description

Figure 1:
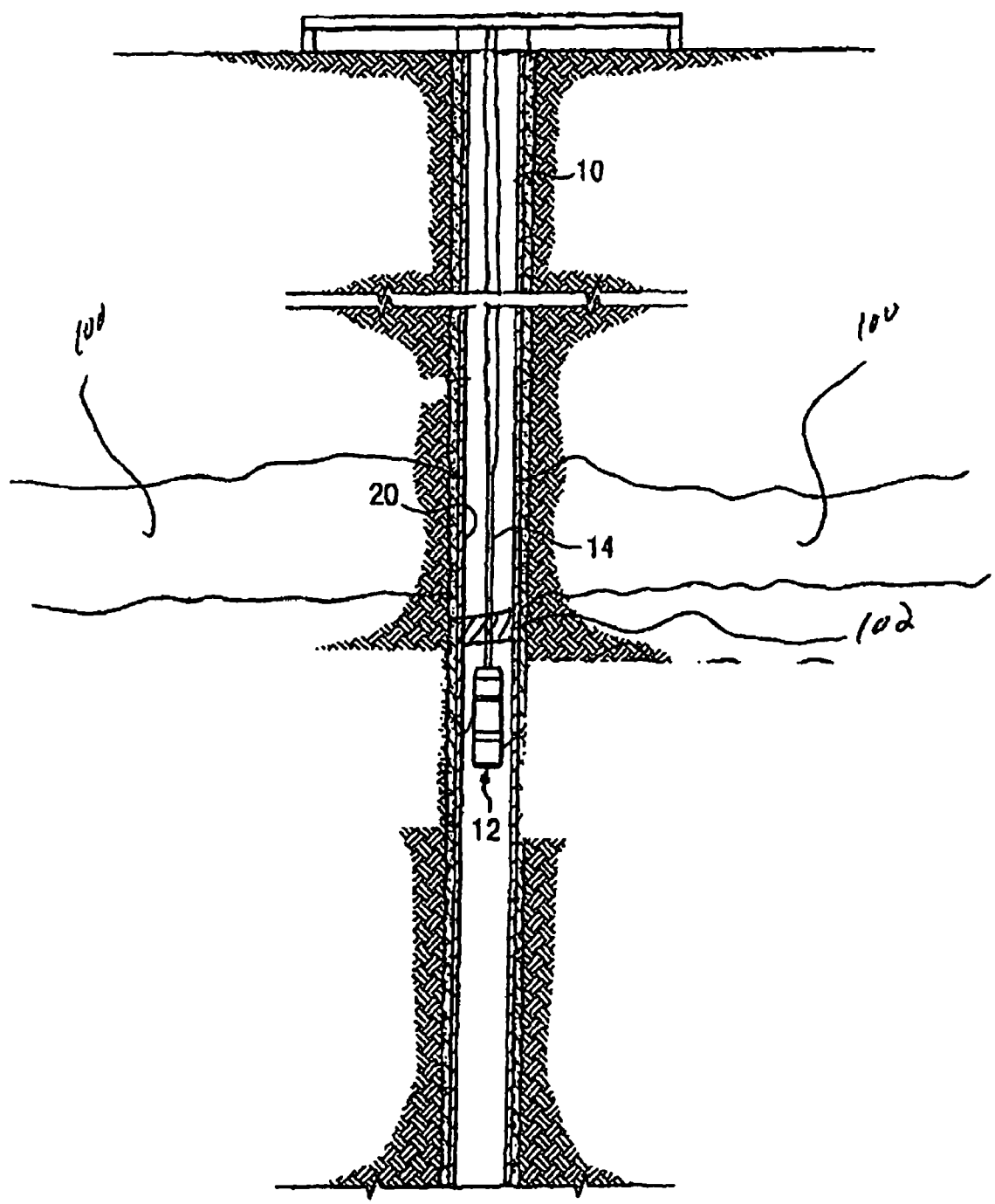
FIG. 1 illustrates a system for hydraulic fracturing operations, according to some embodiments of the invention.

FIG. 1 illustrates a system for hydraulic fracturing operations, according to some embodiments of the invention. A wellbore 10 penetrates a subterranean formation for the purpose of recovering hydrocarbon fluids from the formation. A tool 12 is lowered into the wellbore 10 to a depth that is below a fracture treatment zone 100 by a string 14, in the form of wireline, coiled tubing, wireline inside coil tubing, slickline, tubing, wired pipe, armed coaxed cable or the like, which is connected to the upper end of the tool 12. In some embodiments, the coiled tubing may be a multiconductor coil. A packer 102 may be coupled to the string 14 and is lowered into the wellbore 10. In some embodiments, the packer 102 may be retrievable, expandable or inflatable. In some embodiments, the packer 102 may be permanent. The packer 102 is positioned above the tool 12 and below the fracture treatment zone 100. In some embodiments, the packer 102 is inflatable. Accordingly, a unit at the surface may inflate the packer 102 through the coiled tubing attached thereto. In some embodiments, the packer 102 may be set on a trip for placing the tool 12 downhole. Alternatively, the packer 102 may be set on a different trip relative to the placing of the tool 12 downhole.

The tool 12 may comprise one or more geophones for microseismic detection and a receiver/transmitter module to communicate with equipment at the surface of the Earth. The string 14 extends from the surface of the Earth to a position in the wellbore 10. In some embodiments, the string 14 extends from a rig (not shown) that is located on the ground surface and over the wellbore 10. The rig is conventional and, as such, includes, inter alia, support structure, a motor driven winch, and other associated equipment for receiving and supporting the tool 12 and lowering it to a predetermined depth in the wellbore 10 by unwinding the string 14 from a reel, or the like, provided on the rig. Also, stimulation, or fracturing, fluid can be introduced from the surface, through the wellbore 10, and into the fracture treatment zone 100.

At least a portion of the wellbore 10 can be lined with a casing 20 which is cemented in the wellbore 10 and which can be perforated as necessary, consistent with typical downhole operations and with the operations described herein. Perforations may be provided though the casing 20 and the cement to permit access to the fracture treatment zone 100. In some embodiments, a string of production tubing (not shown) having a diameter greater than that of the tool 12, and less than that of the casing 20, may be installed in the wellbore 10 and to extend from the ground surface to a predetermined depth in the casing 20.

During a hydraulic fracturing operation, a fracturing fluid carrying a proppant is introduced into the wellbore 10. By monitoring the changes in the data sensed and displayed in real time, personnel would then be able to quickly and efficiently adjust downhole conditions such as proppant concentration, pump rates, fluid properties, net pressures, and other variables, to control the safety and efficiency of the fracturing operation, and to obtain optimum fracture design. The treatment of the formation generates the hydraulically induced fractures. The geophones in the tool 12 detect the microseismic events that result from the hydraulic induced fracturing. After the treatment is complete, in some embodiments, the packer 102 is then deflated. The packer 102 and the tool 12 are then retrieved.

While described such that the tool 12 is below the fracturing operation, embodiments are not so limited. In some embodiments, the tool may be positioned adjacent to or above the fracturing operation. In some embodiments, multiple tools may be used. For example, a first tool may be positioned above, and a second tool is positioned below the fracturing operation. Thus, one to any number of geophones may be used to detect the microseismic events. In some embodiments, a packer is not used. In some embodiments, the packer may be positioned at different zones in the wellbore. Accordingly, sequential fracturing operations may be performed at different locations in the wellbore. In some embodiments, geophones may be mounted at one or more locations on a wire that is lowered into the wellbore. In some embodiments, the geophones may be mounted at different locations in the wellbore without a wire (such as on the casing 20).

Noise Cancellation and Dampening

The signals acquired by the geophones in the tool 12 may be processed to detect the microseismic events therein that are caused by the hydraulic fracturing operation. The hydraulic fracturing operation may produce noise that may be removed during the processing of the acquired signal to detect the microseismic events. Such noise may be caused by the pumps at the surface and the fluid moving through the wellbore and fracture treatment zone, etc. In some embodiments, one to a number of different noise cancellation operations is performed to reduce the surrounding noise for detection of the microseismic events resulting from the hydraulic fracturing operation. The noise cancellation operations may be performed in real time or offline. Such operations may be performed in the tool 12 or by equipment at the surface. The noise cancellation operations may be performed by hardware, software, firmware or a combination thereof.

In some embodiments, the signal acquired by the geophones is processed using various signal processing analog and/or digital filtering operations. Such operations may remove the unwanted noise from the signal that is created by the hydraulic fluid being pumped down the well bore and out the perforations of the casing and into the formations. Examples of the different filtering operations that may be used include cross correlation functions, band pass, etc. In some embodiments, an adaptive noise cancellation operation is performed. In some embodiments, geophones, accelerometers and other sensors may be positioned near potential noise sources. These noise signals acquired may be used as input into the noise cancellation operation.

Figure 2:
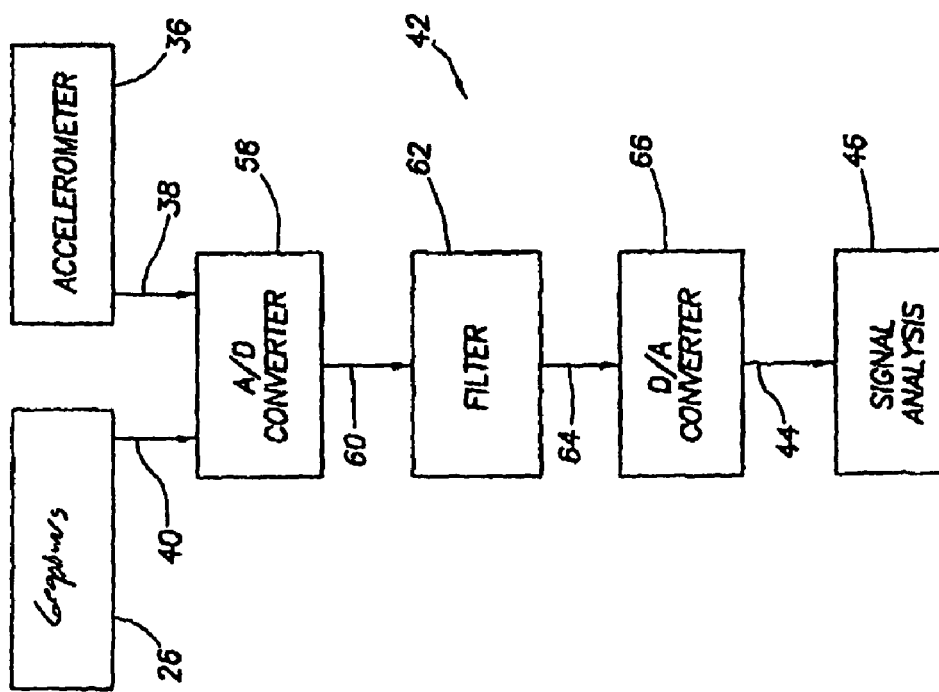
FIG. 2 illustrates a block diagram of a part of a system for filtering a signal captured during hydraulic fracturing operations, according to some embodiments of the invention.

FIG. 2 illustrates a block diagram of a part of a system for filtering a signal captured during hydraulic fracturing operations, according to some embodiments of the invention. A filtering device 42 receives the signals 40, 38 output by a geophone 26 and an accelerometer 36, respectively, and produces an output signal 44 which is input to a signal analysis unit 46.

Initially, the signals 38, 40 are preferably input to an analog-to-digital converter 58. This step may also include signal conditioning, e.g., placing the signals 38, 40 in a usable form for the remainder of the signal filtering process. An output 60 of the converter 58 is, thus, in digital form and ready for further processing.

The converter output 60 (which includes digitized and conditioned versions of the signals 38, 40) is then input to a filter 62. The filter 62 performs the function of reducing or eliminating the contribution of the noise signal to the contaminated signal 40. An output 64 of the filter 62, thus, is more closely representative of the microseismic events due to the hydraulic fracturing rather than due to noise sources (e.g., the pump noise, fluid flow noise, etc.).

The filter output 64 may be transmitted directly to the signal analysis unit 46 in digital form, or it may be input to another converter 66 prior to transmission to the signal analysis unit. As depicted in FIG. 2, the converter 66 is a digital-to-analog converter since, in this particular example, the signal analysis unit 46 is configured to receive analog signals. The converter 66 may also include signal conditioning to place the output 44 in a form usable by the signal analysis unit 46.

Figure 3:
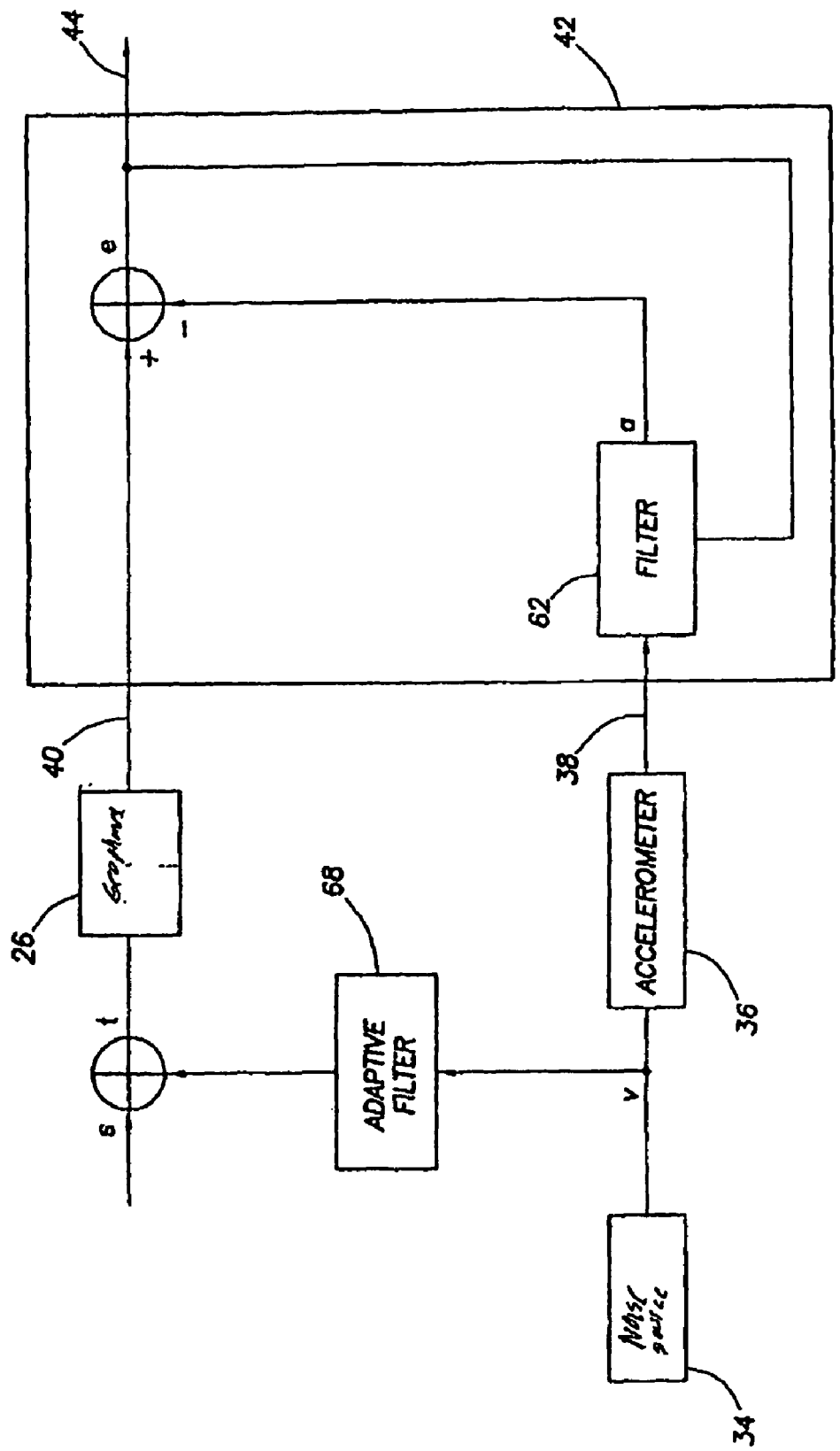
FIG. 3 illustrates an adaptive filtering for processing the signal acquired during hydraulic fracturing operations, according to some embodiments of the invention.

FIG. 3 illustrates an adaptive filtering for processing the signal acquired during hydraulic fracturing operations, according to some embodiments of the invention. FIG. 3 illustrates a schematic diagram of the filtering device 42.

As depicted in FIG. 3, the letter "s" is used to indicate the desired signal that includes the microseismic events, which is acquired during the hydraulic fracturing operations, and which may be contaminated by its combination with the noise signal. A noise source 34 is depicted in FIG. 3 as being the source of noise (indicated by the letter "v"). This noise "v" is altered in unknown ways by environmental factors 68, such as the flow of the fluid, the type of fluid, the speed of the pumps, size of perforations, etc., and results in a variation in the noise as indicated by an output 40. This variation due to the noise source 34 is the noise signal, which is combined with the desired signal "s" to produce the noise-contaminated signal (indicated by the letter "t"). The noise-contaminated signal "t" is detected by one of the geophones 26, which produces the noise-contaminated signal 40.

The noise "v" may be detected by an accelerometer 36, which produces the signal 38 indicative or characteristic of the noise "v". Both the noise-contaminated signal 40 and the signal 38 characteristic of the noise v are input to the filtering device 42. The filtering device 42 includes a filter 62, which is preferably of the type known to those skilled in the art as an adaptive filter.

The filter 62 receives the signal 38 and produces an output signal indicated in FIG. 2 by the letter "a". The output signal "a" is summed with (actually, subtracted from) the noise-contaminated signal 40 to produce an error output indicated in FIG. 2 by the letter "e". This error output "e" is input to the adaptive filter 62, which adapts to minimize the error.

Figure 4:
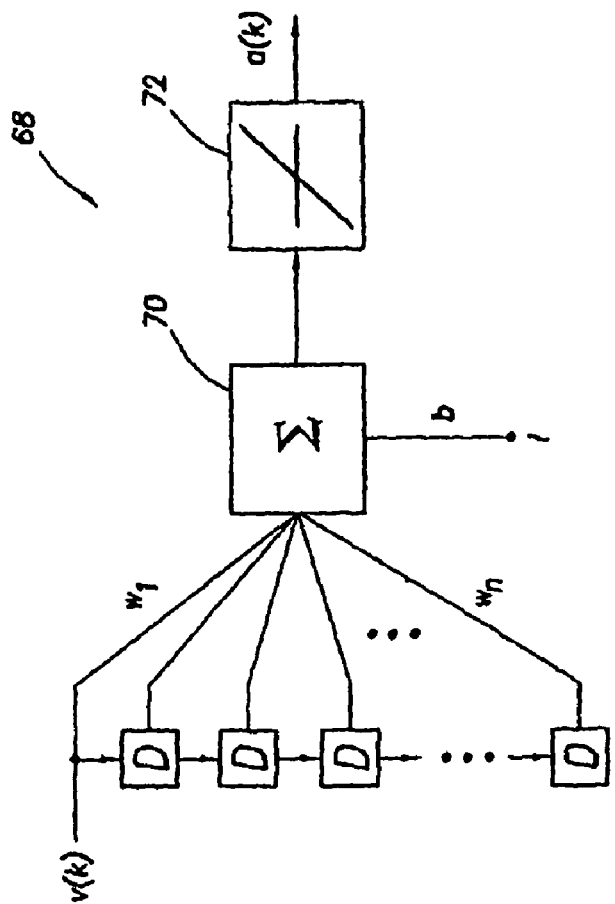
FIG. 4 illustrates an adaptive filter, according to some embodiments of the invention.

FIG. 4 illustrates an adaptive filter, according to some embodiments of the invention. An example of an adaptive filter 68 which may be used for the filter 62 in the filtering device 42 is representatively illustrated. The signal 38 characteristic of the noise "v" is indicated in FIG. 4 by the function v(k), where k is a time sample index. A number n of tapped-delay inputs D are individually weighted ($w_1$ through $w_n$) and summed in a summer 70 along with a parameter b. One or more additional optional linear function 72 may be applied to the output of the summer 70 to produce the output a(k).

Thus, the output a(k) of the filter 68 is given by the following equation:

$$a(k) = w_1 v(k) + w_2 v(k-1) + \ldots + w_n v(k-n) + b$$

The filter parameters w and b may be updated in real-time in the direction of gradient descent, i.e.:

$$w(k+1) = w(k) + \eta e(k) v^{TM}(k)$$

$$b(k+1) = b(k) + \eta e(k),$$

where $w(k) = [w_1(k)\ w_2(k) \ldots w_n(k)]$, $v^T(k) = [v(k) \ldots v(k-1)\ v(k-n)]$, $\eta$ is the learning rate, and e(k) is the "error" at the sample time index k.

Each time an error value is obtained, a new sample is loaded, and the filter parameters are updated again. The learning rate $\eta$ and number n of tapped-delay lines D are preferably adjustable by the user, for example, using some type of user interface to obtain the "cleanest" (noise-free) output signal 44.

It is to be clearly understood that any type of adaptive filter could be used for the filter 62. For example, an adaptive IIR filter structure, or a more complex nonlinear filter, such as a neural network, could be used. Any of the many numerical optimization algorithms, such as the extended Kalman filter, recursive Gauss-Newton, recursive least-squares, Levenberg-Mardquart, etc. can be used to train or adjust the filter 62.

Figure 5:
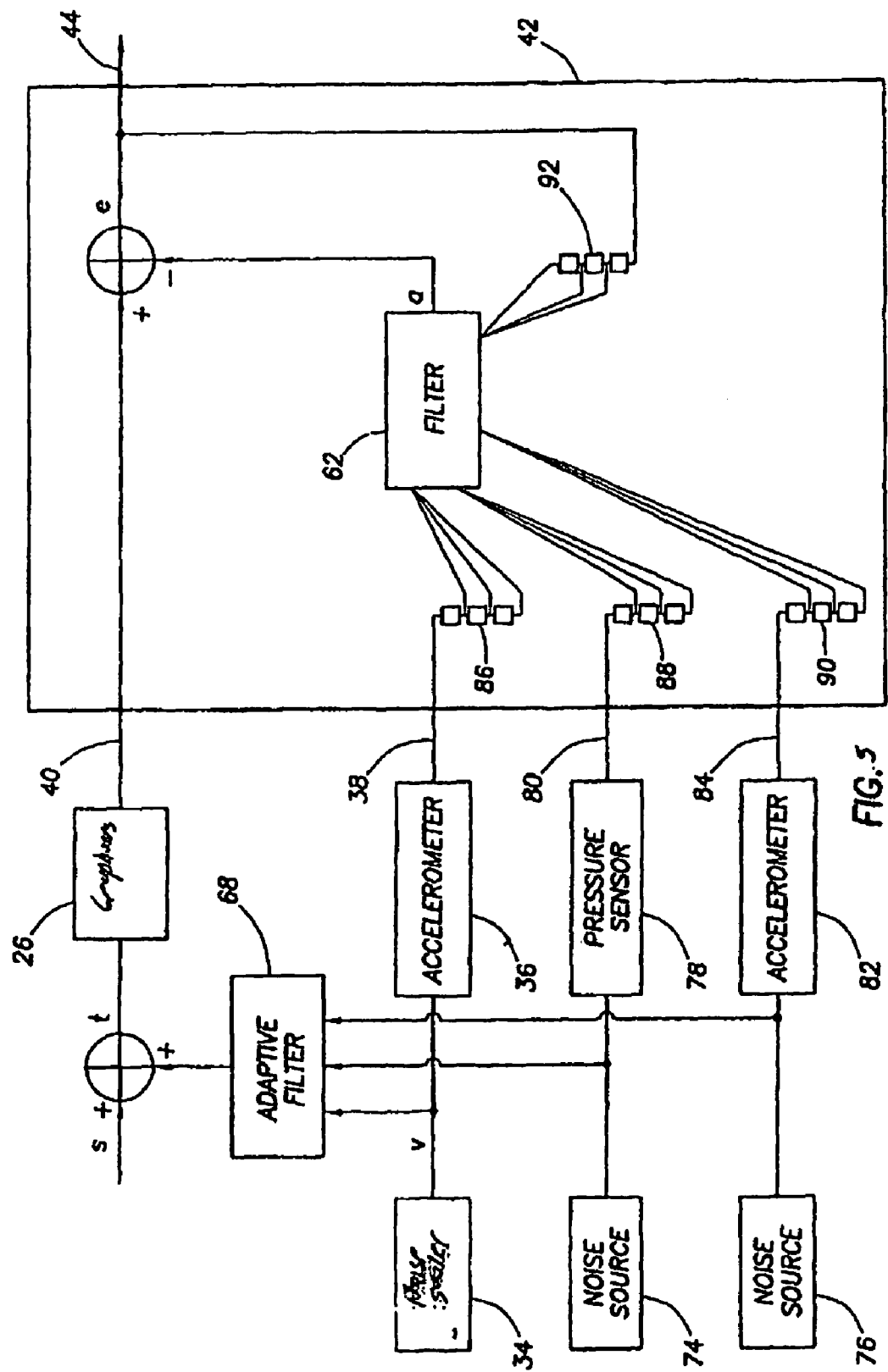
FIG. 5 illustrates an adaptive filtering for processing the signal acquired during hydraulic fracturing operations, according to some other embodiments of the invention.

FIG. 5 illustrates an adaptive filtering for processing the signal acquired during hydraulic fracturing operations, according to some other embodiments of the invention. FIG. 5 illustrates a schematic diagram of the filtering device 42.

As shown, multiple noise sources 34, 74, 76 contribute to the noise. For example, the noise sources 34, 74, 76 may be the hydraulic pump at the surface for pumping the fluid downhole, the fluid flow, etc.

Each of the signals 38, 80, 84 is input to the adaptive filter 62 using respective tapped-delay lines 86, 88, 90. The output "a" of the adaptive filter 62 is summed with the contaminated force sensor signal 40, and the resulting error "e" is also input to the filter using a tapped-delay line 92 to update the filter parameters "w" and "b". Parameters of the filter 62, such as weights applied to each of the individual tapped-delay inputs, may be updated with each sample of values in the signals 40, 38, 80, 84.

One or more additional filters, such as the linear filter 72 shown in FIG. 4, may also be used in this alternate construction of the filtering device 42. Note that the filter 62 may be a linear adaptive filter, or a nonlinear adaptive filter, such as a neural network.

Figure 6:
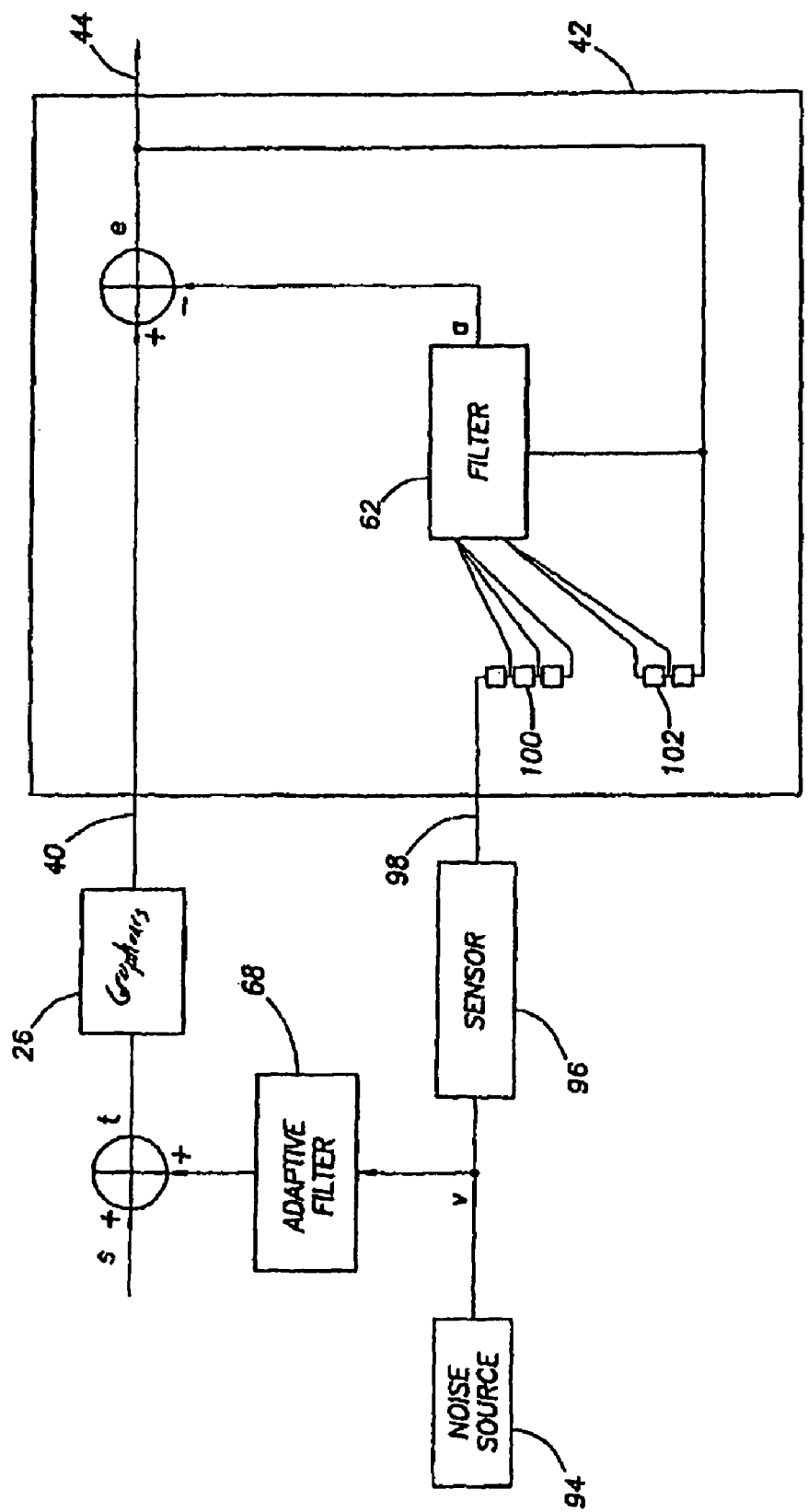
FIG. 6 illustrates an adaptive filtering for processing the signal acquired during hydraulic fracturing operations, according to some other embodiments of the invention.

FIG. 6 illustrates an adaptive filtering for processing the signal acquired during hydraulic fracturing operations, according to some other embodiments of the invention. FIG. 6 illustrates a schematic diagram of the filtering device 42. As shown, only one noise source 94 is used. A sensor 96 attached to, or part of, the noise source 94 produces a signal 98 indicative or characteristic of the noise generated by the noise source.

The signal 98 is input to the adaptive filter 62 via a tapped-delay line 100. The filter 62 generates an output a, which is summed with the noise-contaminated signal 40. The resulting error "e" is input to the adaptive filter 62 via a tapped-delay line 102.

One or more additional filters, such as the linear filter 72 shown in FIG. 4, may also be used in this alternate construction of the filtering device 42. Note that the filter 62 may be a linear adaptive filter, or a nonlinear adaptive filter, such as a neural network. Additional description of the noise filtering is set forth in U.S. Pat. No. 7,053,787 to Schultz, et al., (assigned to Halliburton Energy Services, Inc.) issued May 30, 2006, which is hereby incorporated by reference.

In some embodiments, active cancellation may be used to cancel the noise. For example, acoustic waves may be generated that may cancel the noise generated by the pumps at the surface by using piezos or other similar devices. In some embodiments, noise captured at the surface may be used to generate a similar pattern in the well bore that may cancel the effect of the surface noise. The direct communication link between the surface and downhole may allow a quick generation of a "cancellation signal" in the well bore.

In some embodiments, the pumping at the surface may be performed in a pulse pattern. Accordingly, during moments while the pump is not pumping, features of the signal may be obtained to detect the microseismic events. A model may fill the moments when the pumping is in progress. The profile of the flow of the output ports of the tool may be reviewed to reduce the noise profile. Such profile may be reviewed to generate some specific patterns that may assist in the detection of the microseismic events.

In some embodiments, various noise dampening techniques may be used alone or in combination with the noise cancellation operations. For example, various mechanical dampening methods may be used to remove the unwanted noise. The mechanical dampening could include using a specially designed packer above the geophones and below the perforations to isolate the fluid flow and to dampen the vibrations. A heavy rubber material similar to the "flubber" used on the Bi-modal Acoustic Tool may be used. See U.S. Pat. Nos. 5,886,303 to Rodney (Assignee: Dresser Industries, Inc.) issued Mar. 23, 1999; 6,102,152 to Masino, et al. (Assignee: Halliburton Energy Services) issued Aug. 15, 2000; 6,151,554 to Rodney (Assignee: Dresser Industries, Inc.) issued Nov. 21, 2000, all hereby incorporated herein by reference. In some embodiments, one or more dampening packers may be positioned below the isolation packer.

Various cancellation and damping techniques have been described. Such techniques may be performed in any combination. In particular, one, some or all of the techniques may be performed together.

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some or all of the operations described herein may be performed by hardware, firmware, software or a combination thereof. Upon reading and comprehending the content of this disclosure, one of ordinary skill in the art will understand the manner in which a software program can be launched from a machine-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
    receiving a signal by a sensor that is positioned within a well bore, wherein the signal is caused as a result of a hydraulic fracture that originates from the well bore wherein the signal is received; and
    detecting a microseismic event within the signal, wherein the detecting comprises performing a noise canceling operation on the signal.

2. The method of claim 1, wherein the signal comprises ambient noise, wherein the noise canceling operation comprises canceling at least a part of the ambient noise.

3. The method of claim 2, wherein the ambient noise is a result, at least in part, from the hydraulic fracture.

4. The method of claim 3, further comprising detecting the ambient noise, wherein the noise canceling operation comprises adaptive filtering.

5. The method of claim 4, wherein the noise canceling operation comprises summing an output from the adaptive filtering with the signal to generate an error output, wherein the error output is to be input back into the adaptive filtering.

6. The method of claim 5, wherein ambient noise is a result of at least one of an operation of a hydraulic pump at the surface of the Earth and fluid flow in the well bore.

7. The method of claim 4, wherein adaptive filtering comprises using a number n of tapped-delay inputs D that are weighted $w_1$ through $w_n$, respectively, wherein an output $a(k) = w_1 v(k) + w_2 v(k-1) + \ldots + w_n v(k-n) + b$, wherein the function $v(k)$ is representative of the ambient noise where k is a time sample index.

8. The method of claim 7, wherein at least one of the parameters, $w_n$ and b, may be updated in real time in a direction of minimum error.

9. An apparatus comprising:
    a tool to be positioned in a wellbore where a hydraulic fracture is to originate from, the tool comprising:
        at least one geophone to monitor a microseismic event that is a result of the hydraulic fracture; and
        a filtering device to receive a signal representative of the microseismic event from the at least one geophone, wherein the filtering device is to cancel, from the signal, at least a part of noise that is caused by the hydraulic fracture.

10. The apparatus of claim 9, wherein the filtering device comprises an adaptive filter.

11. The apparatus of claim 10, further comprising:
    first means to capture a noise signals from a one or more noise sources, wherein the adaptive filter is to receive as input the noise signals.

12. The apparatus of claim 11, wherein the filtering device is to sum an output from the adaptive filter with the signal to generate an error output, wherein the error output is to be input into the adaptive filter.

13. The apparatus of claim 11, wherein the first noise source comprises a hydraulic pump at the surface of the Earth and wherein a second noise source comprises fluid flow in the wellbore.

14. The apparatus of claim 9, wherein the noise is from a group consisting of noise from a pump to pump fluid into the wellbore as part of the hydraulic fracture, noise from the fluid in the wellbore and noise from the fluid in the fracture treatment zone.

15. The apparatus of claim 9, wherein the tool is to be positioned below where the hydraulic fracture is to originate from in the wellbore.

16. The apparatus of claim 9, wherein the tool is coupled to a coiled tubing to lower the tool into the wellbore.

17. A system comprising:
    a tool to be positioned in a treatment well where a hydraulic fracture operation is to originate from, the tool comprising at least one geophone to monitor a microseismic event that is a result of the hydraulic fracture operation; and
    a filtering device, at a surface of the Earth, to receive data representative of the microseismic event from the at least one geophone, wherein the filtering device is to cancel, from the data, at least a part of noise that is caused by the hydraulic fracture operation.

18. The system of claim 17, wherein the at least one geophone is to capture a signal that is a result of the microseismic event, wherein the signal captured also comprises noise that is caused by the hydraulic fracture operation.

19. The system of claim 18, wherein the tool further comprises a sensor to detect the part of the noise that is caused by the hydraulic fracture operation, wherein the filtering device is to receive as input the signal that is the result of the microseismic event and the part of the noise detected by the sensor.

20. The system of claim 19, wherein the filtering device comprises an adaptive filter.

21. The system of claim 20, wherein the adaptive filter comprises a number n of tapped-delay inputs D that are weighted $w_1$ through $w_n$, respectively, wherein an output $a(k) = w_1 v(k) + w_2 v(k-1) + \ldots + w_n v(k-n) + b$, wherein the function $v(k)$ is representative of the noise where k is a time sample index.

22. The system of claim 21, wherein at least one of the parameters, $w_n$ and b, may be updated in real time in a direction of minimum error.

23. The system of claim 17, further comprising means for actively canceling at least part of the noise.

24. The system of claim 17, further comprising a hydraulic pump at the surface of the Earth, wherein the hydraulic pump is to pump fluid, in a pulse pattern, down the treatment well for the hydraulic fracture operation, wherein the at least one geophone is to capture the data representative of the microseismic event during a period when the hydraulic pump is not pumping the fluid within the pulse pattern.

25. The system of claim 17, further comprising a packer positioned in the treatment well.

26. The method of claim 1, further comprising receiving a noise signal with a different sensor, wherein detecting the microseismic event within the signal comprises cancelling noise within the signal using the noise signal.

27. The method of claim 26, wherein the different sensor is positioned near a noise source.

28. The method of claim 27, wherein the different sensor is positioned near a hydraulic pump at or near the surface of the Earth, the hydraulic pump to pump a fluid that causes the hydraulic fracturing operation.

29. The method of claim 27, wherein the different sensor is positioned near where the hydraulic fracture operation originate from in the well bore.

30. The method of claim 27, wherein the different sensor is positioned in the well bore to capture noise from a flow of the fluid that causes the hydraulic fracturing operation.

31. The apparatus of claim 9, further comprising a sensor to capture the part of noise, wherein the part of the noise is input into the filtering device to cancel the at least the part of the noise.

32. The apparatus of claim 31, wherein the sensor is positioned near a noise source.

33. The apparatus of claim 32, wherein the sensor is positioned near a hydraulic pump at or near the surface of the Earth, the hydraulic pump to pump a fluid that causes the hydraulic fracture.

34. The apparatus of claim 32, wherein the sensor is positioned near where the hydraulic fracture originates from in the well bore.

35. The apparatus of claim 32, wherein the sensor is positioned in the well bore to capture noise from a flow of the fluid that causes the hydraulic fracture.

36. The system of claim 19, wherein the sensor is positioned near a noise source.

37. The system of claim 36, wherein the sensor is positioned near a hydraulic pump at or near the surface of the Earth, the hydraulic pump to pump a fluid that causes the hydraulic fracture operation.

38. The system of claim 36, wherein the sensor is positioned near where the hydraulic fracture operation originates from in the well bore.

39. The system of claim 36, wherein the sensor is positioned in the well bore to capture noise from a flow of the fluid that causes the hydraulic fracture operation.

* * * * *

UNITED STATES PATENT AND TRADEMARK OFFICE
CERTIFICATE OF CORRECTION

PATENT NO.       : 8,368,553 B2                                      Page 1 of 1
APPLICATION NO. : 12/445649
DATED            : February 5, 2013
INVENTOR(S)      : Zannoni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this
First Day of September, 2015

Michelle K. Lee
*Director of the United States Patent and Trademark Office*